United States Patent [19]

Lin et al.

[11] Patent Number: 5,742,711
[45] Date of Patent: Apr. 21, 1998

[54] LOW-DISTORTION AND HIGH-SPEED COLOR IMAGE SCANNER

[75] Inventors: Chun-Chen Lin; Ching-Fu Chung, both of Hsin-Chu, Taiwan

[73] Assignee: Mustek Systems Inc., Taiwan

[21] Appl. No.: 726,833

[22] Filed: Oct. 8, 1996

Related U.S. Application Data

[63] Continuation-in-part of Ser. No. 368,664, Jan. 4, 1995, abandoned.

[51] Int. Cl.$^6$ ....................................... H04N 1/56
[52] U.S. Cl. .................... 382/275; 358/514; 358/516; 358/463; 348/572
[58] Field of Search ............... 358/461, 462–464, 358/514, 516, 530, 532; 348/223, 572, 573, 577; 382/270, 274, 275; H04N 1/56

[56] References Cited

U.S. PATENT DOCUMENTS

| | | |
|---|---|---|
| 4,675,727 | 6/1987 | Sekizawa et al. . |
| 4,707,615 | 11/1987 | Hosaka . |
| 4,809,061 | 2/1989 | Suzuki . |
| 4,954,888 | 9/1990 | Fogaroli et al. ................ 358/514 |
| 5,105,286 | 4/1992 | Sakurai ........................ 358/464 |
| 5,305,122 | 4/1994 | Hayashi et al. . |
| 5,319,450 | 6/1994 | Tamayama et al. ............ 348/692 |

*Primary Examiner*—Kim Vu
*Attorney, Agent, or Firm*—Cushman Darby & Cushman Intellectual Property Group of Pillsbury Madison & Sutro LLP

[57] ABSTRACT

The present invention is an image scanner adapted to be used for scanning a color image which includes an image sensor which converts the scanned color image into three analog voltage signals, a clock generator which provides a clock for the image sensor outputting the three analog voltage signals in response to the clock, three amplifying switches electrically connected to the image sensor through three respective independent signal paths and respectively having three disablers thereon for respectively enabling/disabling the amplifying switches by utilizing an impedance thereof in order to respectively amplify the three analog voltage signals and transmit one of the amplified voltage signals therethrough at a time, an analog-to-digital converter electrically connected to the three amplifying switches which respectively converts the three analog voltage signals into digital signals and a data-processing device electrically connected to the analog-to-digital converter which receives and stores the digital signals. The present invention has an advantage of avoiding the signal distortion and has a fast scanning and processing speed.

12 Claims, 6 Drawing Sheets

LOW-DISTORTION AND HIGH-SPEED COLOR IMAGE SCANNER

FIELD OF THE INVENTION

The present invention is a CIP application of the parent application bearing the Ser. No. 08/368,664 and filed on Jan. 4, 1995, now abandoned.

The present invention is related to an image scanner, and more particularly to an image scanner for scanning a color image.

BACKGROUND OF THE INVENTION

A schematic block diagram of a conventional scanner for scanning a color image is shown in FIG. 1, which includes a driving means 11, a color CCD 12, an analog multiplexer 13, a current reset 14, an amplifier 15, an analog-to-digital converter 16, a buffer memory 17, a writing counter 18, a reading counter 19, and an address multiplexer 20. The driving means 11 provides a clock for the color CCD 12. The color CCD 12 converts an image signal of a scanned article into three analog signals respectively corresponding to three colors, i.e. red, green and blue. The analog multiplexer 13 controls the transmission of the three analog signals to allow only one of these analog signals to be transmitted at one time. The current reset 14 is used for excepting a direct current component of each of the analog signals. The analog signal is then transmitted through and amplified by the amplifier 15. The amplified analog signal is converted into a digital signal by the analog-to-digital converter 16 and then stored in the buffer memory 17. The writing and reading addresses in the buffer memory 17 are respectively generated by the writing counter 18 and the reading counter 19, and transmitted through the address multiplexer 20 to be written by row or read by column.

However, the conventional scanner has the following shortcomings.

1. The conventional scanner utilizes the analog multiplexer 13 to achieve the purpose of dividing colors and transmitting a signal corresponding to one color at one time. When one of the switches, e.g. SR, in the analog multiplexer 13 is made in an ON state and the other switches are in an OFF state, certain impedances of the off switches are still existent, as shown in FIG. 2 which is a schematic diagram showing the conventional analog multiplexer 13, so that the impedance at the output point A of the switch SR will be influenced by the impedance at the points B and C. Therefore, the signal outputted through A will be distorted.

2. In general, the voltages of the analog signals are required to be equal to cater for the working requirement of the follow-up devices. The responsivities of the color CCD 12 to the three colors are different so that the obtained analog signal voltages responsive to the three colors are also different. However, the conventional scanner only utilizes the amplifier 15 to amplify the analog signals but does not provide any measure to adjust the signals to the same voltage value.

The aforementioned second point can be overcome by using a CPU software to control the amplifying rate to equalize the voltages of the three analog signals responsive to the three colors. However, the software method will prolong the processing time of the entire scanning and processing time.

The relevant prior art of image scanner includes:

1) U.S. Pat. No. 4,809,061 entitled "Image Readout Method And Apparatus" issued to Suzuki and referred to as Ref. 1 accordingly hereinafter; and 2) U.S. Pat. No. 5,305,122 entitled "Image Reading And Processing Apparatus suitable For Use As A Color Hand-Held Scanner" issued to Hayashi et al and referred to as Ref. 2 hereinafter.

SUMMARY OF THE INVENTION

An object of the present invention is to provide an image scanner which is able to avoid the image distortion without a need of software programs.

Another object of the present invention is to provide an image scanner which is able to shorten the scanning and processing time.

The present invention is an image scanner to be used for scanning a color image which includes an image sensor which converts the scanned color image into three analog voltage signals, a clock generator which provides a clock for the image sensor outputting the three analog voltage signals in response to the clock, three amplifying switches electrically connected to the image sensor through three respective independent signal paths, respectively having three disablers thereon for respectively enabling/disabling the amplifying switches by utilizing an impedance thereof in order to respectively amplify the three analog voltage signals and transmit one of the amplified voltage signals therethrough at a time, an analog-to-digital converter electrically connected to the three amplifying switches which respectively convert the three analog voltage signals into digital signals and a data-processing device electrically connected to the analog-to-digital converter which receives and stores the digital signals. The present image scanner may further includes a digital-to-analog converter electrically connected to the analog-to-digital converter for providing a reference voltage for the analog-to-digital converter, and a driving device electrically connected to the image sensor for driving the image sensor to scan over entirely the image.

In accordance with another aspect of the present invention, the three analog voltage signals are three ones respectively representing three colors which are red, green and blue. The image sensor is a CCD or a color CCD when scanning a color image. The data-processing device includes a memory storing therein the digital signals, and a memory-controlling device electrically connected to the analog-to-digital converter for controlling addresses of the digital signals stored in the memory.

In accordance with another aspect of the present invention, the present image scanner further includes a host which through the memory-controlling device reads the digital signals stored in the memory.

In accordance with another aspect of the present invention, a program is employed to disable the amplifying switch by triggering a selector.

In accordance with another aspect of the present invention, an AD813-type IC is employed to be the amplifying switch.

However, according to the construction using the amplifying switches as shown in FIG. 6 of this specification, the advantages of this invention over Ref. 1 and Ref. 2 include:
(1) the elimination of image distortion, and
(2) the reduction of time for scanning and processing the R, G, B signals.

The disadvantage of the configuration including switches 34, 41, and 46, a selector 35 and amplifier 55 as depicted in FIG. 1 of Ref. 1 is that the amplification ratios for the R, G and B signals are identical. Therefore, if the primary magnitudes of the R, G, and B signals are different before the signals are amplified, they are still different after the signals are processed by the selector and the amplifier. Therefore, the color-balance problem will be induced and the image distortion occurs. If a software is employed for distortion compensation, a longer time is required, and thus the real-time display function is no more possible.

However, in contrast to the disadvantages of Ref. 1, the progressive feature developed by employing the construction of amplifying switches according to the present invention is that each of the signals transmitted through different channels constructed between the image sensor and the amplifying switches can be amplified individually and the magnitudes thereof can be consistent with one another without requiring any post-processing procedure, e.g. by software. Therefore, the signal-adjustable function, image color-balance function, and real-time display function are available.

As to the major differences between the disclosure of Ref. 2 and this invention, the R, G, B signals outputted from the CCD are amplified first and selected for processing by the selector in Ref. 2's disclosure, while the R, G, B signals are chosen before they are amplified by the amplifying switches in the present invention.

A disadvantage of the configuration that comprises amplifiers 421, 422, 423 and selector 424 as disclosed in FIG. 25 of Ref. 2 is that three amplifiers are required for amplifying three signals transmitted through an identical channel and the amplifications of the signals will be influenced by one another.

As described in Ref. 2, the output terminal of the CCD is just a single channel, as described in column 15, lines 17–29 and the R, G, B signals are transmitted in series via this single channel, and thus all the three input nodes of these three amplifiers must be connected to the only output channel of the CCD. Therefore, the feedback resistors of these three amplifiers are connected in parallel, and because the gain of the amplifier equals to the ratio of Resistance (feedback)/Resistance (in), the amplifiers are influenced by one another by the feedback impedance of each amplifier.

Referring now to FIGS. 3 & 4, there are shown gain analysis schematical diagrams according to the present invention and Ref. 2. As shown in FIG. 3 which is embodied by the present invention, in theory, the inner impedance Zi of the amplifier is infinite, however, in practice, it is impossible for this real inner impedance to be an infinite impedance. Accordingly, a tiny current generated from the source signal Isignal will pass through the inner impedance Zi and affect the output voltage generated from the Rout of the amplifier.

Therefore, if the input terminals of all the employed amplifiers are electrically connected with the source signal Isignal, as depicted in FIG. 4, also embodied in FIG. 25 of Ref. 2, the source signal Isignal will not only generate a leakage current Isignal 1 to influence the output voltage generated from Rout 1 but also generate a leakage current Isignal 2 to affect the output voltage generated from Rout 2, and thus the gains of relevant amplifiers are mutually affected by the respective leakage currents Isignal 1 and Isignal 2. Accordingly, a distortion of an amplified image signal is unavoidable.

Nevertheless, if the source signal Isignals of the relevant amplifiers are electrically independent of each other, as depicted in FIG. 3, also embodied in the present invention, the defects mentioned above occurring in Ref. 2 will not appear.

Specifically, in contrast to Ref. 2, owing to the fact that the amplifying switches can have the same or different gains, so that the R, G, and B signals can be controlled and processed independently in the present invention, any influence among these amplifiers will not be caused, so that the image distortion problem will not occur.

Therefore, the distinguishable characteristics of this invention from those of Ref. 2 include that, the outputs of the CCD respectively pass through three channels, and each of these three channels is individually connected to the input node of each amplifier, that is the input nodes of these three amplifying switches are separated, and how the amplifying switch is chosen for operation is achieved by disabling another amplifying switches. Therefore, there is no such problem as occurred in the method employed by Ref. 2.

Additionally, the most important feature of the present invention is that an amplifying switch having enabling/disabling functions disclosed in the present invention is capable of performing the amplifying and switching (selection) operations in one single unit rather than two respective elements i.e. an amplifier and a switch (selector) for performing the same functions aforementioned as are respectively disclosed by Ref. 1 and Ref. 2.

Since the disabling function of the amplifying switch disclosed in the present invention is performed by setting the output of the amplifying switch to be high impedance via driving the disabler (e.g. select 1, as shown in FIG. 6 of this specification), the signal will not be influenced by this disabled amplifying switch but merely be amplified by the enabled amplifying switch.

However, the switch/selector respectively employed by Ref. 1/Ref. 2 are independent of the used amplifier(s) and the amplifying function of each amplifier will not depend on the operation of the switch/selector. Hence, the R, G and B signals will all be influenced by the amplifier(s) no matter whether the signal is needed to be processed or not, and therefore an image distortion phenomenon resulting from Ref. 1/Ref. 2 is unavoidable.

Besides, the switch/selector respectively employed by Ref. 1/Ref. 2 are generally manipulated by utilizing a certain saturation voltage for triggering the switch/selector performance in order to respectively switch or select the amplifiers or the processed signals, and accordingly, the signal's voltage is limited by the saturation voltage.

However, owing to the amplifying switch disclosed in the present invention is enabled/disabled by utilizing the internal impedance thereof, the processed signal accordingly will not be restricted to the threshold voltage caused by the saturation voltage of the switch/selector.

Therefore, it is clear from above comparisons, the functions of the amplifying switch invented in the present invention can fully cover and are superior to those of the amplifier together with those of the switch (selector) employed by Ref. 1 or Ref. 2 and that's why the product developed according to the present invention is now welcomed in the U.S. market for its superior design and excellent performance.

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
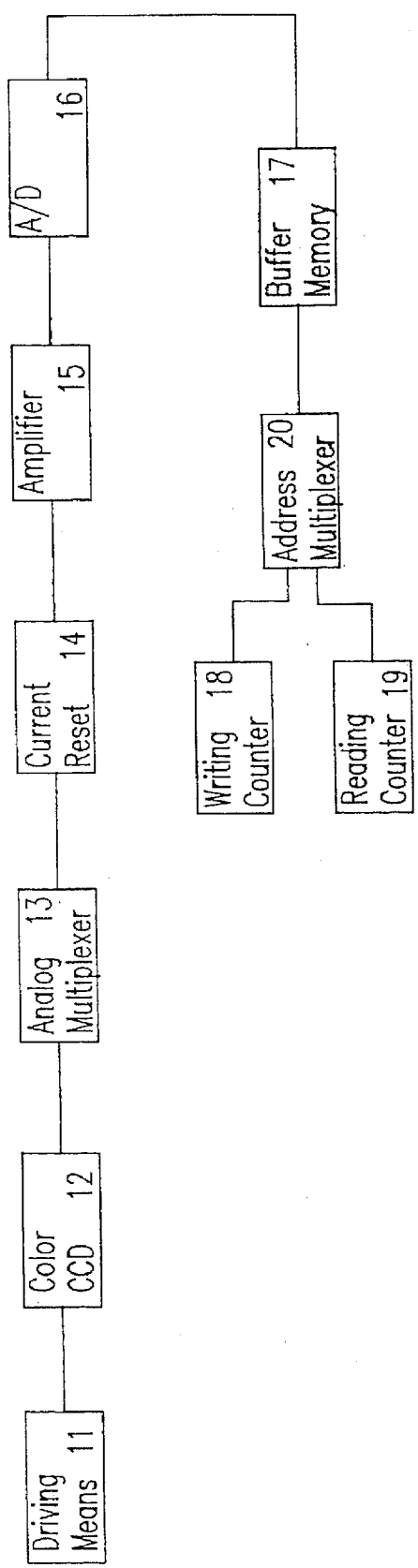
FIG. 1 is a schematic block diagram showing a conventional scanner.
Figure 2:
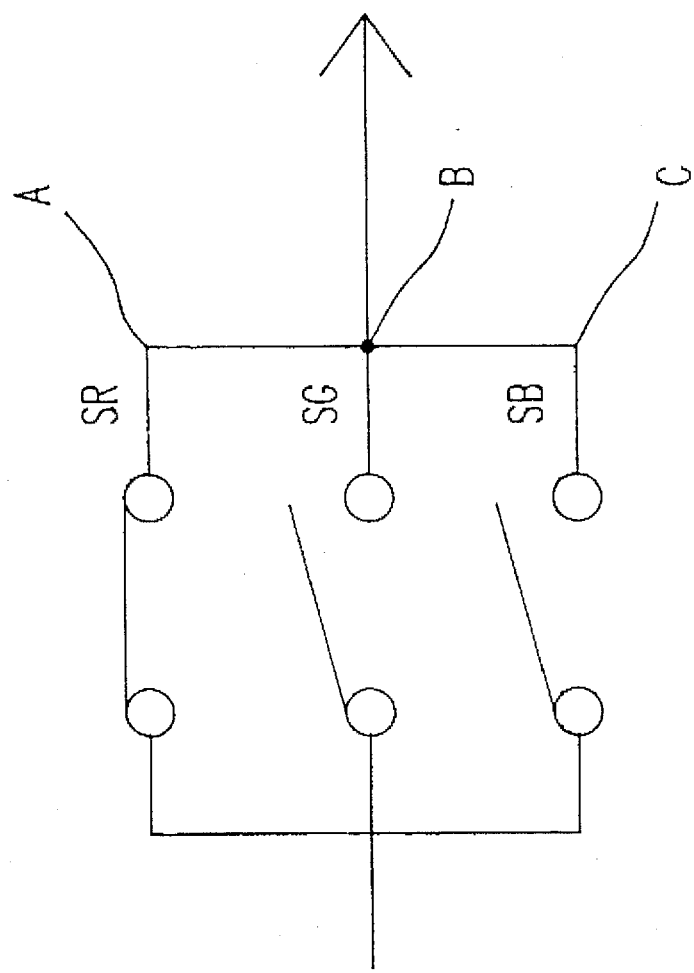
FIG. 2 is a schematic diagram showing a conventional multiplexer.
Figure 3:
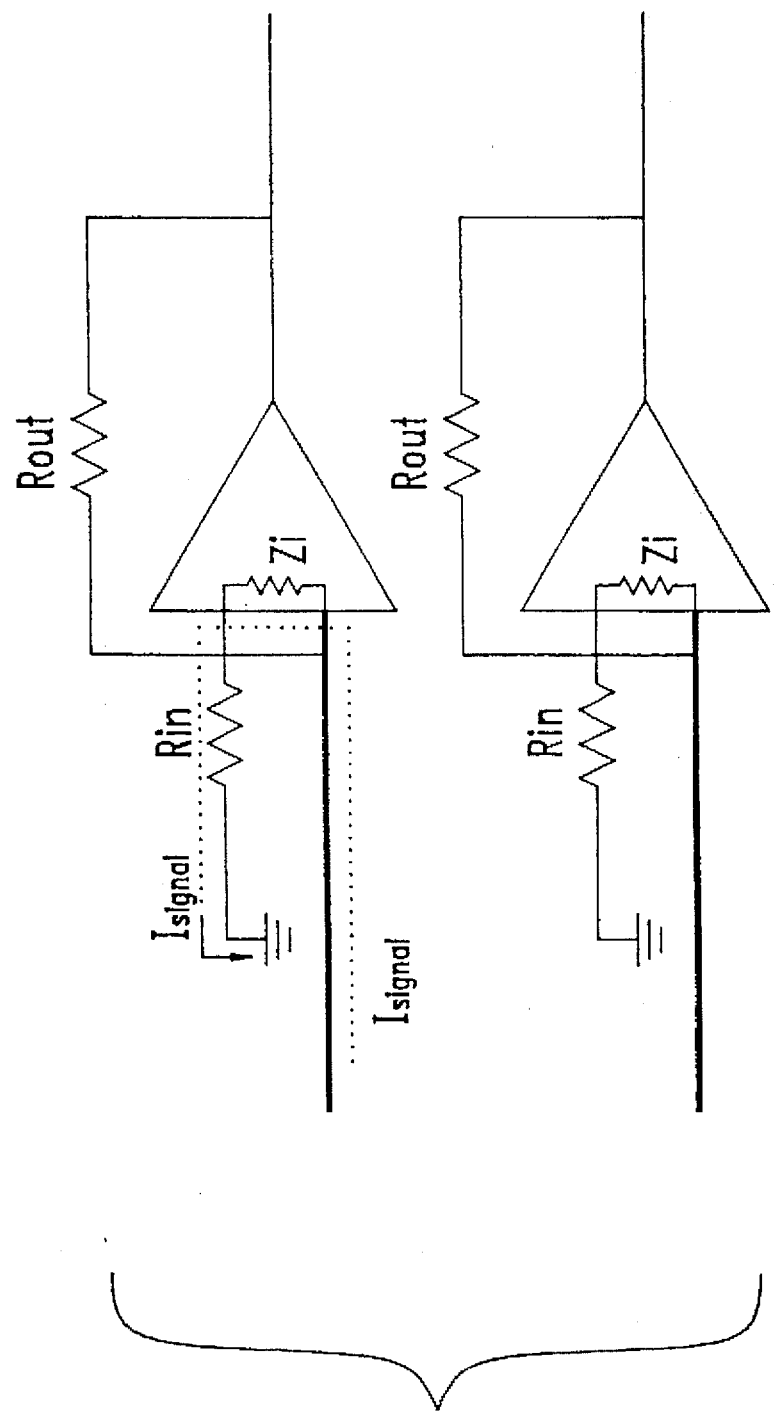
FIG. 3 is a gain analysis for an amplifier assembly according to the present invention.
Figure 4:
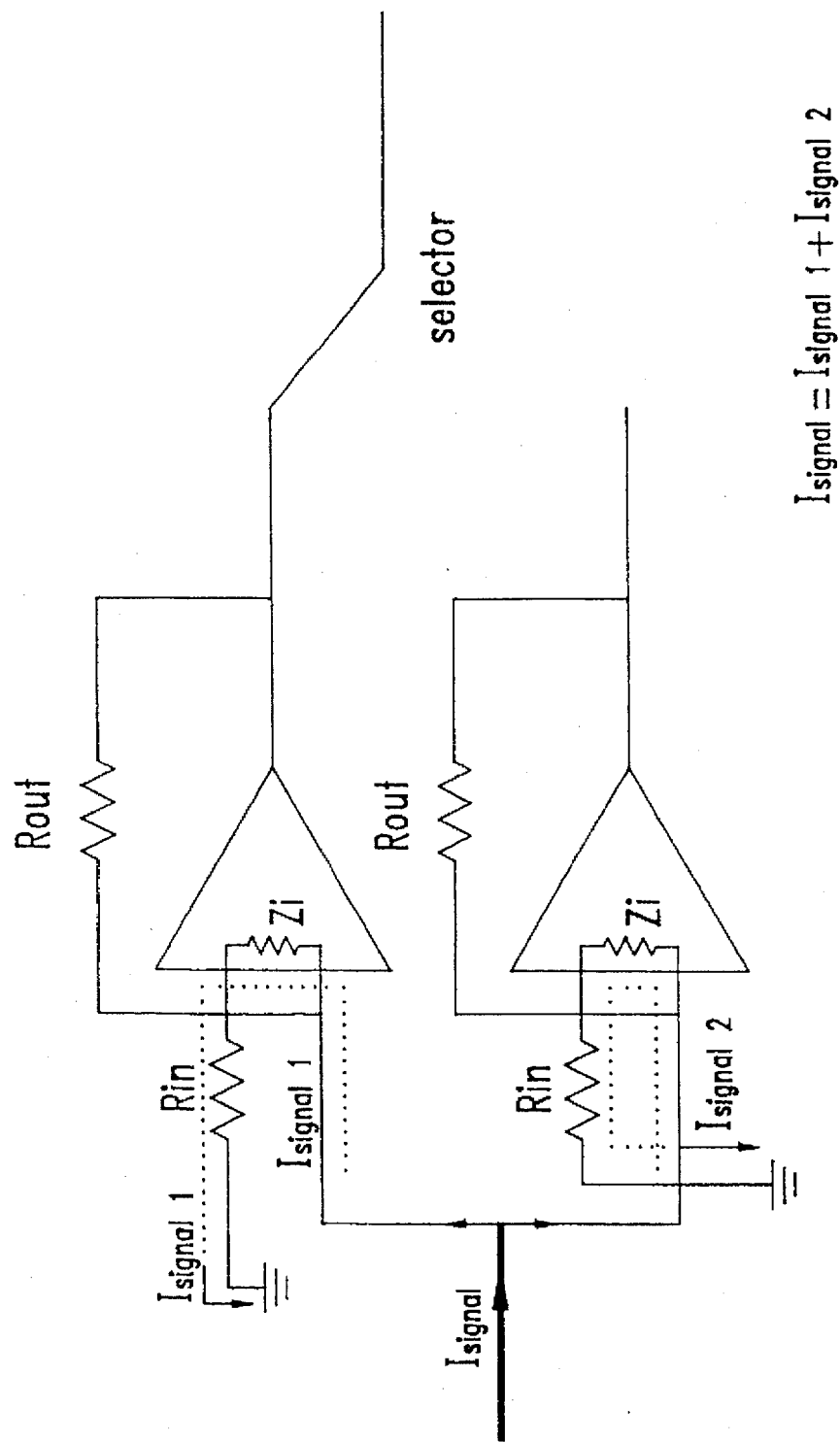
FIG. 4 is a gain analysis for the conventional amplifier assembly.
Figure 5:
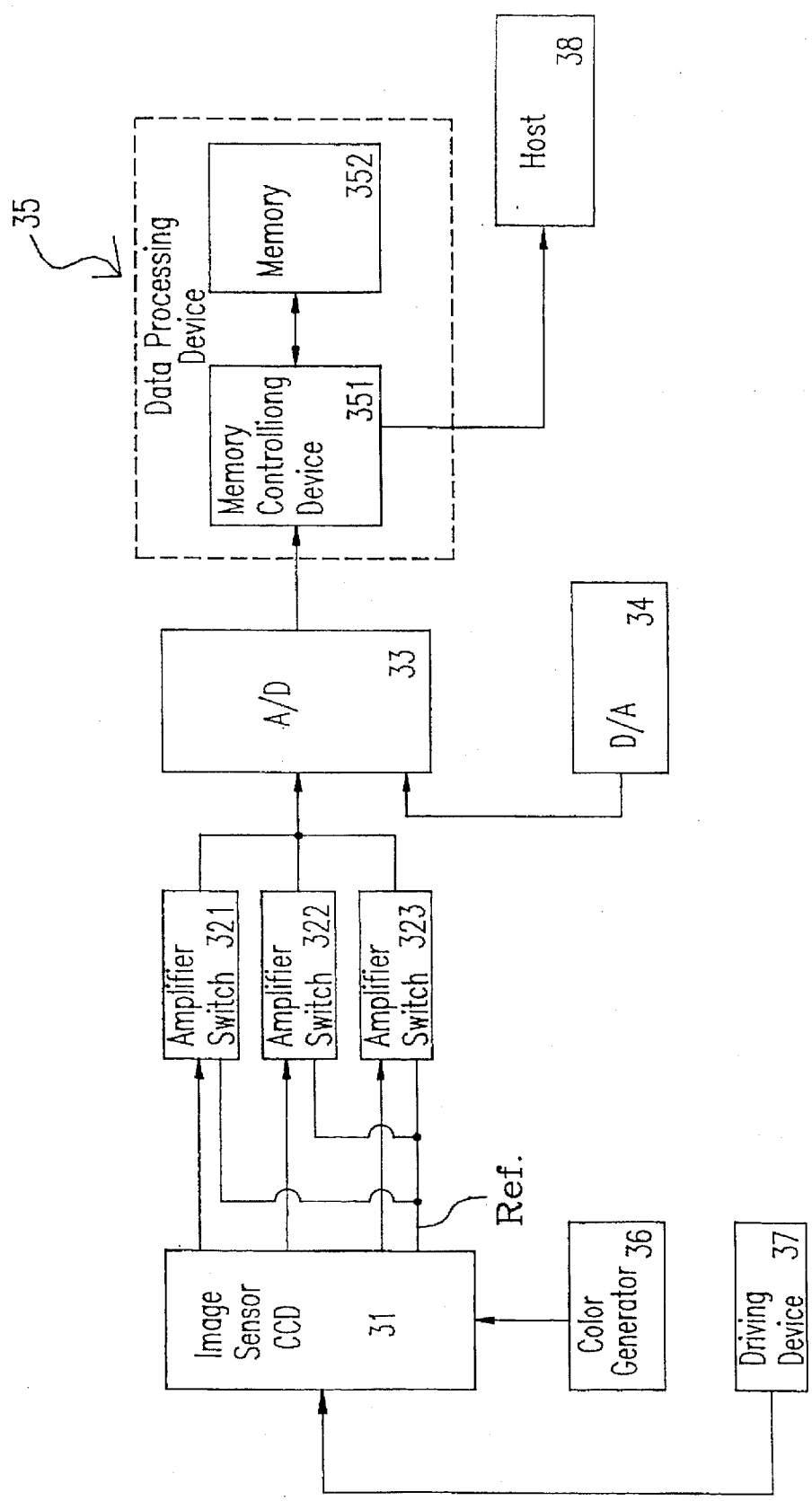
FIG. 5 is a schematic block diagram showing a preferred embodiment of an image scanner according to the present invention.

Please refer to FIG. 5 which is a schematic block diagram showing a preferred embodiment of an image scanner according to the present invention. The present image scanner includes an image sensor 31, e.g. a color CCD, three amplifying switches 321, 322 and 323, an analog-to-digital converter 33, a digital-to-analog converter 34, a data-processing device 35, a clock generator 36, and a driving device 37, wherein the data-processing device 35 further includes a memory-controlling device 351 and a memory 352.

The clock generator 36 is used to provide a clock for the color CCD 31 to make the color CCD 31 able to generate three analog voltage signals corresponding to three colors, i.e. red, green and blue, simultaneously. The light emitted to a scanned article is focused to the color CCD 31 by a condensing lens. After the color CCD 31 finishes exposing, the image of the scanned article is converted into the three analog voltage signals corresponding to the three colors. At the same moment, the amplifying switch 321 is switched to an ON state by a program stored in the scanner to trigger the selectors 3221 and 3231 depicted in FIG. 6 for disabling the amplifying switches 322 and 323, and therefore the other two amplifying switches 322 and 323 are in an OFF state, i.e. the outputs of two amplifying switches 322 and 323 are set to be of high impedance, so that the first one of the three signals which passes through the amplifying switch 321 is independently obtained. The analog signal corresponding to the first color which is amplified and transmitted by the amplifying switch 321 is differentially amplified with respect to the differential signal represented by a symbol "Ref." and then sent to the analog-to-digital converter 33 to be converted into a digital signal. The digital-to-analog converter 34 provides a reference voltage for the analog-to-digital converter 33 to achieve a specific image-processing effect. The obtained digital signal is written into the memory 352 by the memory-controlling device 351. When the first signal corresponding to the first color is written into the memory 352, the color CCD 31 proceeds the second exposure and then the amplifying switch 322 is switched to an ON state and the other two amplifying switches 321 and 323 are set to be in an OFF state via the program stored to trigger the respective selectors 3211 and 3231 for disabling the amplifying switches 322 and 323, so that the second one of the three signals which passes through the amplifying switch 322 is independently obtained. Also, the second analog signal corresponding to the second color is converted into a digital signal by the analog-to-digital converter 33 and then written into and stored in the memory 352. Likewise, the color CCD 31 proceeds the third exposure and then the amplifying switch 323 is switched to an ON state and the other two amplifying switches 321 and 322 are set to be in an OFF state if their respective disabling selectors 3211 and 3221 have been triggered by employing the program stored in the scanner, so that the third one of the three signals which passes through the amplifying switch 323 is independently obtained. Similarly, the third analog signal corresponding to the third color is converted into a digital signal by the analog-to-digital converter 33 and then written into and stored in the memory 352. After all the three signals corresponding to the three colors are processed, the driving device 37 changes the relative positions of the color CCD 31 and the scanned article to proceed with the exposure of the next scan line. By this way, the color CCD 31 can scan over entirely the image of the scanned article. When the obtained digital data in the memory 352 are accumulated to a certain length, a host 38 may read the digital data stored in the memory 352 through the memory-controlling device 351.

Figure 6:
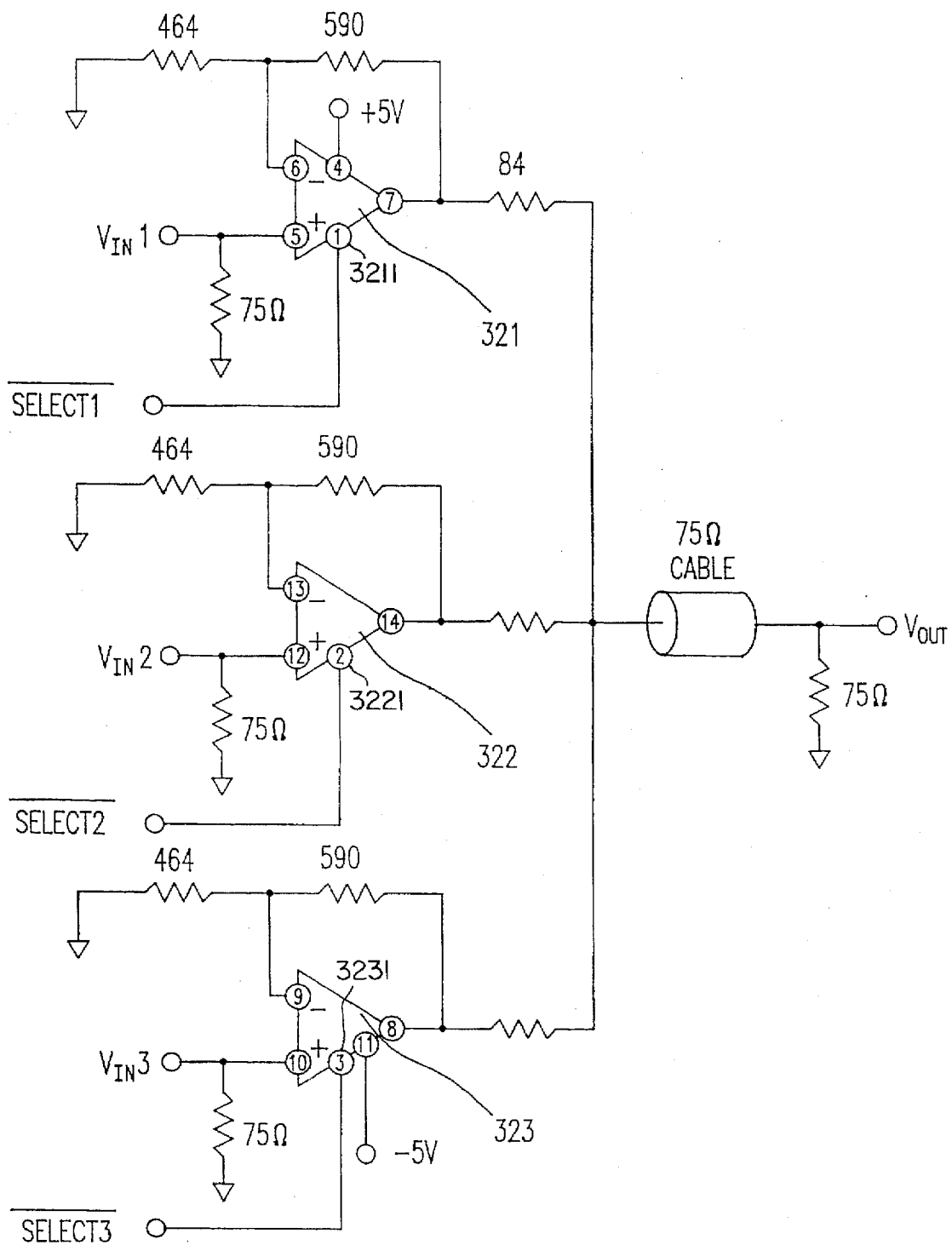
FIG. 6 is a schematic circuit diagram showing a preferred embodiment of a combination state of three amplifying switches according to the present invention.

FIG. 6 is a schematic circuit diagram showing a preferred embodiment of a combination state of three amplifying switches according to the present invention. The present image scanner utilizes an AD813-type IC produced by Analog Devices Corp. to construct the three amplifying switches. The numbers in small circles in this figure respectively represent the pin numbers of the AD813-type IC.

In general, there exists a physical clearance between sensing media for any two of the three colors in a color image sensor. Therefore, the present invention may process the three digital signals by discontinuously writing the digital signals into the memory 352 but continuously transmitting the digital data to the host 38, or continuously writing the digital signals into the memory 352 but discontinuously transmitting the digital data to the host 38. The host 38 can then rearrange the order of the data corresponding to the three colors.

The present image scanner uses three amplifying switches to divide and amplify the three analog signals corresponding to the three colors, so the respective amplifying rates for the three analog signals can be so adjusted that their voltage values can be the same. In addition, because the adjustment of the amplifying rates is accomplished by hardware, the processing speed of the present image scanner is faster than that of the conventional scanner which utilizes software to control the amplifying rates. Furthermore, using three independent amplifying switches to divide the three signals has an advantage of avoiding the signal distortion caused by the impedance of the other devices. The reason is that when one of the switches is switched on, the other two switches are set to be of high impedance so that the impedance at the output of the switch in an ON state can be ignored in comparison with the high impedance of the other two switches.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image scanner adapted to be used for scanning a color image comprising:

an image sensor which converts said scanned color image into three analog voltage signals;

a clock generator which provides a clock for said image sensor, said image sensor outputting said three analog voltage signals in response to said clock;

three amplifying switches, each being electrically connected to receive a respective one of said three analog voltage signals output by said image sensor through a respective independent signal path, each of said amplifying switches having a respective output and a respective disabler, said respective disabler enabling/disabling said amplifying switch by utilizing an impedance thereof, said three respective disablers being operative to prevent two of said amplifying switches from amplifying and transmitting two respective ones of said three analog voltage signals to said respective outputs, while enabling the other one of said amplifying switches to amplify and transmit its respective one of said three analog voltage signals to its respective output;

an analog-to-digital converter electrically commonly connected to said respective output of each of said three amplifying switches which converts said amplified and transmitted three analog voltage signals into digital signals; and a data-processing device electrically connected to said analog-to-digital converter which receives and stores said digital signals.

2. An image scanner according to claim 1 further comprising a digital-to-analog converter electrically connected to said analog-to-digital converter for providing a reference voltage for said analog-to-digital converter.

3. An image scanner according to claim 1 further comprising a driving device electrically connected to said image sensor for driving said image sensor to scan over entirely said image.

4. An image scanner according to claim 1 wherein said three analog voltage signals are three ones respectively representing three colors.

5. An image scanner according to claim 4 wherein said three colors are red, green and blue.

6. An image scanner according to claim 1 wherein said image sensor is a CCD.

7. An image scanner according to claim 1 wherein said image sensor is a color CCD.

8. An image scanner according to claim 1 wherein said data-processing device includes:

a memory storing therein said digital signals; and a memory-controlling device electrically connected to said analog-to-digital converter for controlling addresses of said digital signals stored in said memory.

9. An image scanner according to claim 1 further comprising a host which through said memory-controlling device reads said digital signals stored in said memory.

10. An image scanner according to claim 1, further comprising three selectors respectively coupled to said respective disablers of said three amplifying switches.

11. An image scanner according to claim 10, further comprising a program employed to selectively disable said three amplifying switches by selectively triggering said selectors.

12. An image scanner according to claim 11, wherein an AD813-type IC is employed as said amplifying switch.

* * * * *